(12) United States Patent
Parris et al.

(10) Patent No.: US 11,853,683 B2
(45) Date of Patent: *Dec. 26, 2023

(54) LEARNING-BASED ANALYZER FOR MITIGATING LATCH-UP IN INTEGRATED CIRCUITS

(71) Applicant: Silicon Space Technology Corporation, Austin, TX (US)

(72) Inventors: Patrice M. Parris, Phoenix, AZ (US); David R. Gifford, Pflugerville, TX (US); Bernd Lienhard, Austin, TX (US)

(73) Assignee: Silicon Space Technology Corporation, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/958,930

(22) Filed: Oct. 3, 2022

(65) Prior Publication Data

US 2023/0088804 A1    Mar. 23, 2023

Related U.S. Application Data

(63) Continuation of application No. 16/397,571, filed on Apr. 29, 2019, now Pat. No. 11,461,531.

(51) Int. Cl.
*G06F 30/398* (2020.01)
*G06N 5/046* (2023.01)
(Continued)

(52) U.S. Cl.
CPC .......... *G06F 30/398* (2020.01); *G06N 5/046* (2013.01); *G06N 20/00* (2019.01); *G03F 1/42* (2013.01); *G06F 2119/08* (2020.01)

(58) Field of Classification Search
USPC .......................................................... 706/12
See application file for complete search history.

(56) References Cited

U.S. PATENT DOCUMENTS 5,283,202 A * 2/1994 Pike, Jr. .............. H01L 21/3065
257/E21.385
5,576,572 A * 11/1996 Maeda ................. H01L 27/0623
257/591

(Continued)

*Primary Examiner* — Mohammed Alam
(74) *Attorney, Agent, or Firm* — Ranjeev Singh; Singh Law, PLLC

(57) ABSTRACT

Systems and methods related to learning-based analyzers (both supervised and unsupervised) for mitigating latch-up in integrated circuits are provided. An example method includes obtaining latch-up data concerning at least one integrated circuit configured to operate under a range of temperature conditions, where the at least one integrated circuit comprises a core portion including at least a plurality of devices each having one or more structural features formed using a lithographic process, and an input/output portion. The method further includes training the learning-based system based on training data derived from the latch-up data and a first layout rule concerning a first spacing between the core portion and the input/output portion. The method further includes using the learning-based system generating a second layout rule concerning the first spacing between the core portion and the input/output portion, where the second layout rule is different from the first layout rule.

20 Claims, 12 Drawing Sheets

(51) Int. Cl.
*G06N 20/00* (2019.01)
*G03F 1/42* (2012.01)
*G06F 119/08* (2020.01)

(56) References Cited

U.S. PATENT DOCUMENTS

| | | | | |
|---|---|---|---|---|
| 7,304,354 | B2* | 12/2007 | Morris | H01L 21/761 |
| | | | | 257/376 |
| 8,252,642 | B2* | 8/2012 | Morris | H01L 21/743 |
| | | | | 438/533 |
| 11,461,531 | B2* | 10/2022 | Parris | G06N 20/00 |
| 2005/0104176 | A1* | 5/2005 | Rodney | H01L 27/12 |
| | | | | 257/E27.111 |
| 2008/0061869 | A1* | 3/2008 | Takatori | H01L 29/66984 |
| | | | | 327/544 |
| 2010/0244179 | A1* | 9/2010 | Voldman | H01L 27/0921 |
| | | | | 257/E29.007 |
| 2014/0184165 | A1* | 7/2014 | Takahashi | H01M 10/48 |
| | | | | 429/90 |
| 2020/0176251 | A1* | 6/2020 | Cook | H01L 21/02628 |
| 2020/0342070 | A1* | 10/2020 | Parris | G06F 30/398 |
| 2023/0088804 | A1* | 3/2023 | Parris | G06F 30/373 |

* cited by examiner

LEARNING-BASED ANALYZER FOR MITIGATING LATCH-UP IN INTEGRATED CIRCUITS

CROSS-REFERENCE TO RELATED APPLICATION(S)

This application is a continuation of U.S. patent application Ser. No. 16/397,571, filed on Apr. 29, 2019, entitled "LEARNING-BASED ANALYZER FOR MITIGATING LATCH-UP IN INTEGRATED CIRCUITS," the entire contents of which are hereby incorporated herein by reference.

BACKGROUND

Increasingly CMOS devices are being deployed in extreme environmental conditions that are present in applications such as avionics, downhole drilling, alternative energy, and Internet of Things (IoT) solutions. A major challenge facing designers of such systems is that many of the commercial integrated circuits used to build such systems are not rated for operation at high temperature.

In addition, all bulk CMOS devices are subject to latch-up. Latch-up effects may range from transient failures, which upset the logic state of the circuit, to functionally disabling regions of the circuit or destroying the device (hard failure). Latch-up may occur due to parasitic devices that are created across a bulk CMOS wafer that become problematic when there is a transient event that has the effect of switching on any of the parasitic structures. Typically, the parasitic structure resembles a silicon-controlled rectifier (SCR) including a p-n diode. Increasing temperature reduces the forward bias voltage of the p-n diode, making it easier for a transient event (single over-voltage, current noise, or single particle) to trigger the parasitic bipolar transistor structure into an "on" state. The reduction of the diode forward bias caused by the increasing temperature reduces latch-up trigger current as the diode is more easily forward biased and this leads to increased possibility of failure. In other words, as temperature is increased, the integrated circuit may become more susceptible to latch-up because the parasitic devices in the p-n diode are more easily triggered with increasing temperature. This may lead to increased frequency or probability of failures ranging from micro-latch to destructive latch-up in the presence of stimuli like current/voltage excursions or energetic particles. At the same time, CMOS devices are increasingly being made smaller via die shrinks and other methodologies.

Die shrinks can decrease die costs and can prolong the economic lifetime of a fabrication facility for producing die. This is because die shrinks increase the number of potential die per wafer (PDPW). A successful die shrink may increase the PDPW with potentially no increase in the concomitant processing cost. The shrink can still be successful with some manufacturing cost increase as long as this increase does not outpace the increase in PDPW if the yield does not change much. Die shrinks may be used by Independent Device Manufacturers (IDMs) to decrease their costs and boost their profit margins while also increasing the apparent capacity of their internal fabs so that they are able to either produce more of their existing products or introduce new products with the existing fabs. Decreasing the manufacturing costs in the fab also prolongs the useful lifetime of that capital. As the cost of building a modern fab, already several billion dollars, continues to increase, extending the profitable lifetime of existing fabs and of new fabs becomes even more important and financially rewarding. For foundries, a successful shrink may be beneficial primarily in the fabs running at capacity. It may both increase their unit profit margin and the number of units produced. As with IDMs, for the foundries, a successful shrink can extend the useful lifetime of a fab. Shrinking the die size, however, can adversely affect the latch-up performance of the integrated circuits. This is a problem for all designs but is particularly a problem with respect to products that are subject to harsh operating conditions, including widely varying operating temperatures or other environmental conditions, such as radiation.

Accordingly, there is a need for systems and methods for mitigating latch-up in integrated circuits more effectively in order to both make existing designs more robust and enable die shrinks without loss of robustness.

SUMMARY

In one example, the present disclosure relates to a method, implemented by a learning-based system comprising at least one processor. The method may include obtaining latch-up data concerning at least one integrated circuit configured to operate under a range of temperature conditions, where the at least one integrated circuit comprises a core portion including at least a plurality of devices each having one or more structural features formed using a lithographic process, and an input/output portion. The method may further include training the learning-based system based on training data derived from the latch-up data and a first layout rule concerning a first spacing between the core portion and the input/output portion. The method may further include using the learning-based system generating a second layout rule concerning the first spacing between the core portion and the input/output portion, where the second layout rule is different from the first layout rule.

In another aspect, the present disclosure relates to a learning-based system including at least one processor and at least one memory. The memory may include instructions to obtain latch-up data concerning at least one integrated circuit configured to operate under a range of temperature conditions, where the at least one integrated circuit comprises a core portion including at least a plurality of devices each having one or more structural features formed using a lithographic process, and an input/output portion. The memory may include instructions to train the learning-based system based on training data derived from the latch-up data and a first layout rule concerning a first spacing between the core portion and the input/output portion. The memory may further include instructions to, using the learning-based system, generate a second layout rule concerning the first spacing between the core portion and the input/output portion, where the second layout rule is different from the first layout rule.

In yet another aspect, the present disclosure relates to a method, implemented by a learning-based system comprising at least one processor. The method may include obtaining latch-up data concerning at least one integrated circuit configured to operate under a range of temperature conditions, where the at least one integrated circuit comprises a core portion and an input/output portion, and where the core portion comprises a plurality of devices each having a corresponding dimension. The method may further include training the learning-based system based on training data derived from the latch-up data and a first layout rule concerning a first spacing between the core portion and the input/output portion. The method may further include using the learning-based system, without varying the dimension associated with each of the plurality of devices, generating a second layout rule concerning the first spacing between the core portion and the input/output portion, where the second layout rule is different from the first layout rule.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated byway of example and is not limited by the accompanying figures, in which like references indicate similar elements. Elements in the figures are illustrated for simplicity and clarity and have not necessarily been drawn to scale.

DETAILED DESCRIPTION

Figure 1:
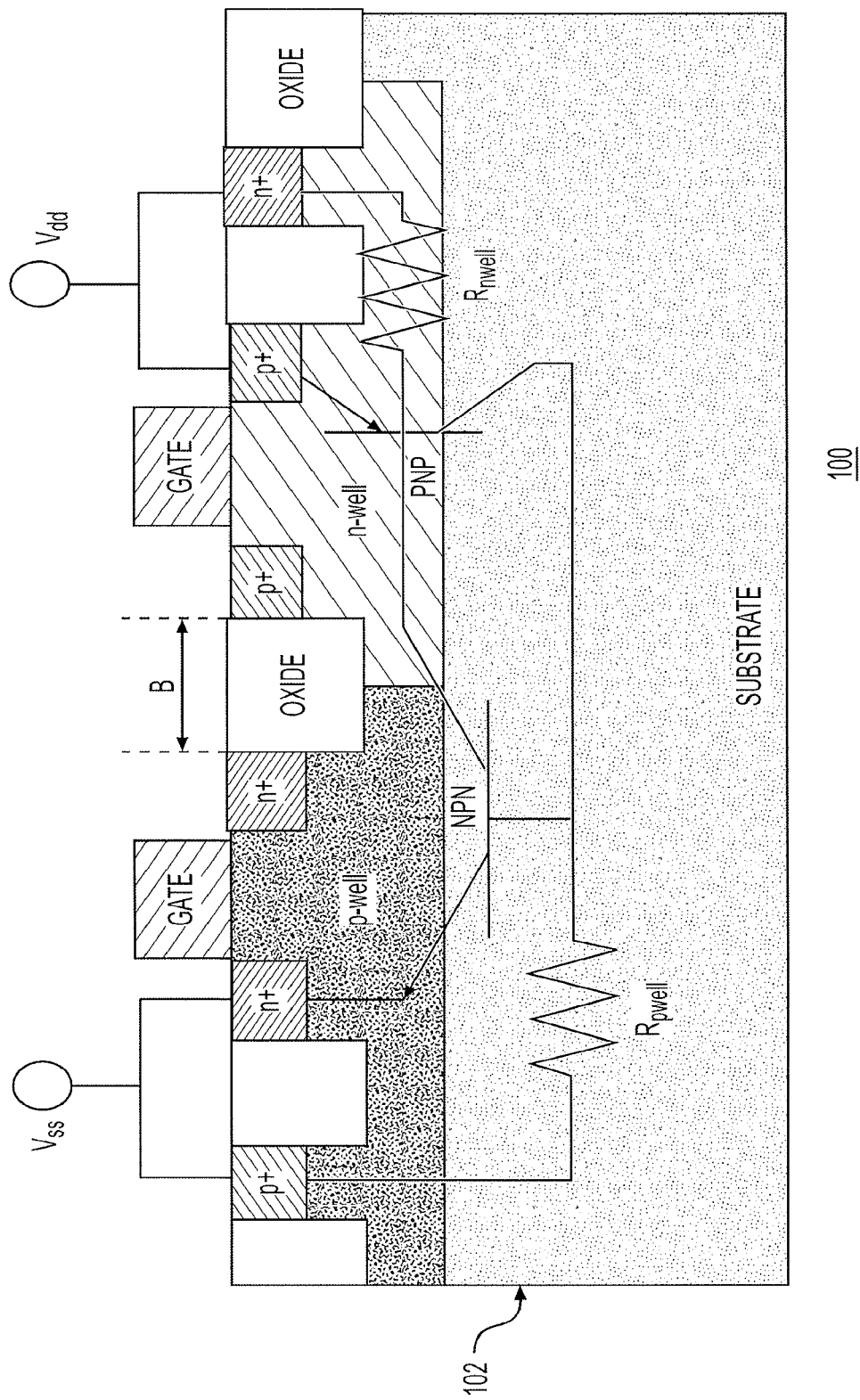
FIG. 1 is a cross section view of a portion of an integrated circuit susceptible to latch up in accordance with one example.

Examples described in this disclosure relate to systems and methods related to learning-based analyzers (both supervised and unsupervised) for mitigating latch-up in integrated circuits. Integrated circuits include but are not limited to Field-Programmable Gate Arrays (FPGAs), Application-Specific Integrated Circuits (ASICs), Application-Specific Standard Products (ASSPs), System-on-a-Chip systems (SoCs), Complex Programmable Logic Devices (CPLDs), Digital-Signal Processors (DSPs), controllers (e.g., automotive controllers, communication controllers, IoT controllers), sensors, image sensors, or other types of integrated circuits.

Certain aspects of the disclosure also relate to reducing spacings related to specific physical mechanisms which limit how closely devices and wells can be spaced. Various methods may be used to implement die shrinks including, for example: (1) optical shrink; (2) optical shrink (no I/O shrink); and (3) selective shrink.

In an optical shrink, all dimensions on the masks used to fabricate the die are scaled by the same factor. The scale factor is less than one and is often set to utilize the photolithography and the etch equipment in the fab to its limits. In some instances, the decision is made to purchase new photolithography and/or etch equipment to further decrease the scaling factor, but the additional expenditure can also reduce the die cost savings which can be realized. Because the scale factor is uniformly applied, both device dimensions and inter-device distances are reduced.

In another approach, in an optical shrink the core area of the die is shrunk, but the I/O ring area is not shrunk. The I/O ring of the integrated circuit is its interface to the external world and needs to connect its core to the external world while also protecting it from external current and voltage excursions. Shrinking the I/O ring area can, therefore, present additional and more severe issues than shrinking the integrated circuit core. Because of this, the choice is sometimes made to shrink the integrated circuit core and leave the I/O ring area unshrunk. This approach is more complex and usually results in a larger die than optically shrinking the entire die. However, it is sometimes chosen when shrinking the I/O ring area while meeting the functional requirements cannot be done within the time-to-market constraints for the shrunken die. With this approach, the device sizes and inter-device separations within the I/O ring area remain the same while the core device sizes and inter-device spacings decrease.

The approach of selective shrink is likely to be used for more integrated ICs where different regions of the core have significantly different functionality requirements or predominantly use different types of devices to implement the required functionality. For example, the core might be composed of digital logic, analog and RF regions. Each device type may impose different limitations on the maximum allowable shrink for the type of region. If it is necessary to shrink the integrated circuit more than the smallest allowed global shrink, each region could be shrunk to its limit and the shrunk regions and shrunk I/O ring areas may be assembled to create the new die. This method is more complex and may require more work than either of the previous two but may result in a smaller die if each region is shrunk optimally. In each shrunken region, both the device dimensions and the inter-device spaces may be reduced. At the boundaries between regions, device spacing rules may be implemented and they are more likely to be tighter than the original rules.

Die shrinks are useful because they increase the number of potential die per wafer (PDPW). The number of good die per wafer (GDPW) and the cost of processing a wafer through a wafer probe are generally the main determinants of the probed, unpackaged die cost. A successful die shrink may increase the PDPW and GDPW with potentially no increase in the concomitant processing cost. The shrink can still be successful with some manufacturing cost increase as long as this increase does not outpace the increase in GDPW. Die shrinks may be used by Independent Device Manufacturers (IDMs) to decrease their costs and boost their profit margins while also increasing the apparent capacity of their internal fabs so that they are able to either produce more of their existing products or introduce new products with the existing fabs. Decreasing the manufacturing costs in the fab also prolongs the useful lifetime of that capital. As the cost of building a modern fab, already several billion dollars, continues to increase, extending the profitable lifetime of existing fabs and of new fabs becomes even more important and financially rewarding. For foundries, a successful shrink may be beneficial primarily in the fabs running at capacity. It may both increase their unit profit margin and the number of units produced. As with IDMs, for the foundries a successful shrink can extend the useful lifetime of a fab.

Certain examples of the present disclosure enable efficient, low-cost die size reduction at any lithography node through the tightening of specific design rules for the baseline process in that node with small additions to the process and potentially without new capital equipment. Also, advantageously since certain aspects of the present disclosure are focused on decreasing inter-device distances and not changing the die sizes, the impact, if any, on die yield is very small.

FIG. 1 is a cross section view 100 of a portion of an integrated circuit 102 susceptible to latch up in accordance with one example. Latch-up is a potentially destructive phenomenon which is driven by parasitic devices in CMOS technology. FIG. 1 shows a simplified view of lumped circuit elements representing parasitic elements in a CMOS process. Resistors $R_{pwell}$ and $R_{nwell}$ represent the respective resistances of the P-Well and N-Well. The PNP transistor has the P+ Source/Drain as emitter, N-Well as Base and P-Substrate and P-Well as Collector. In this example, for the NPN transistor, the N-Well and P-Well/Substrate act as Collector and Base, respectively, while its Emitter is the N+ Source/Drain. Latch-up can be triggered by either Emitter. For example, if the N+ Emitter is forward-biased, injected electrons may be collected by the N-Well. If the electron current is large enough, the induced potential drop in the N-Well resistor may forward-bias the P+/N-Well diode. The injected holes may now be collected by the P-Well contact. A large enough hole current through the P-Well resistor may ensure that the N+/P-Well diode remains forward-biased. This positive feedback loop may lead to latch-up which, at best, may interrupt the correct functioning of integrated circuit 102 and, at worst, may destroy integrated circuit 102. As the spacing B between devices is reduced, latch-up is more easily triggered and sustained, decreasing the reliability of the integrated circuit. As described later, examples in the present disclosure provide a way to eliminate or significantly reduce latch-up in a new design, which also enables the shrunk version of an existing design to have even better or the same latch-up robustness.

The positive feedback previously described above with respect to FIG. 1 can be degraded by either (1) reducing the resistances in order to ensure the induced potential drops are not enough to forward-bias the source/drain to the well emitter junctions or (2) decreasing the NPN and PNP transistor gains so that the injected emitter currents do not create enough collected current to forward-bias the opposite emitter. As an example, in CMOS technology-based devices, as much of the degradation as possible may be done through the well doping profiles, but this may be constrained by the desired transistor parameters and well breakdown voltages. The remaining degradation of the feedback loop may be accomplished through layout design rules that may ensure that the N+ and P+ emitters are kept far enough away from the N-Well/P-Well edge and each other to achieve a tolerable level of latch-up robustness. Since these rules are usually applied throughout the CMOS core and even in the I/O regions, they usually have significant impact on the density of devices and sizes of the integrated circuit.

Figure 2:
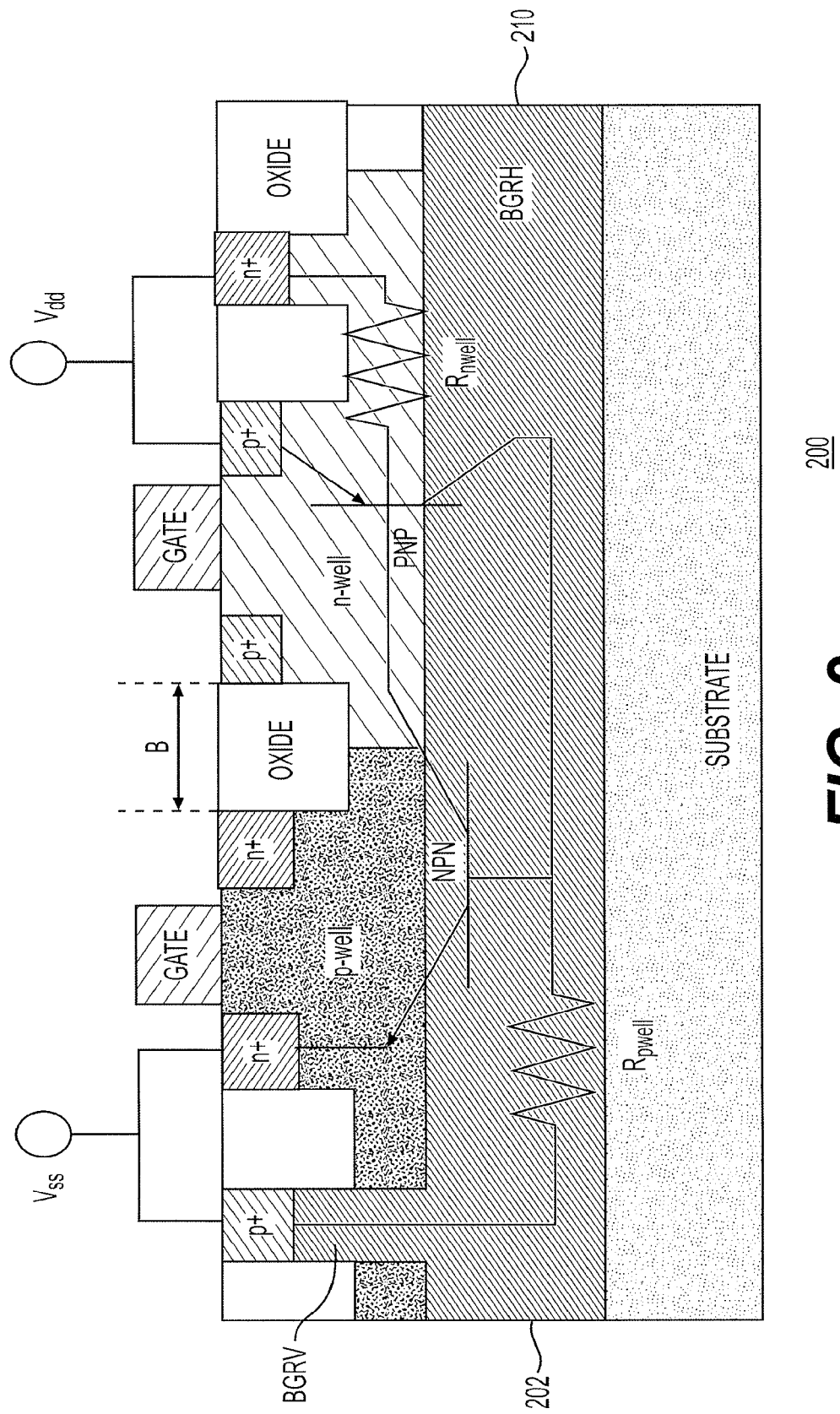
FIG. 2 is a cross section view of a portion of an integrated circuit susceptible to latch up that includes at least one latch-up mitigation structure in accordance with one example.

FIG. 2 is a cross section view 200 of a portion of an integrated circuit 202 otherwise susceptible to latch-up that includes at least one latch-up mitigation structure 210 in accordance with one example. In this example, a heavily doped layer (labeled BGRH) is placed beneath the wells and connected to a constant bias, preferably ground, through additional highly doped regions (labeled BGRV). In this example, the resistance of $R_{pwell}$ resistor is significantly lower in value because of the heavy doping and the decreased resistance makes it significantly more difficult for the NPN transistor to be switched on. In addition, this doping also decreases the NPN transistor's gain, making it harder for the NPN transistor to trigger the PNP transistor. In this example, because the heavily doped regions are removed from the active device areas, their impact on the device is minimal. As the spacing B between devices is reduced, in the absence of the BGRH and BGRV regions, the latch-up susceptibility of this structure increases. The heavily doped layer (labeled BGRH) is placed beneath the wells and connected to a constant bias primarily through the heavily doped vertical BGRV regions.

Figure 3:
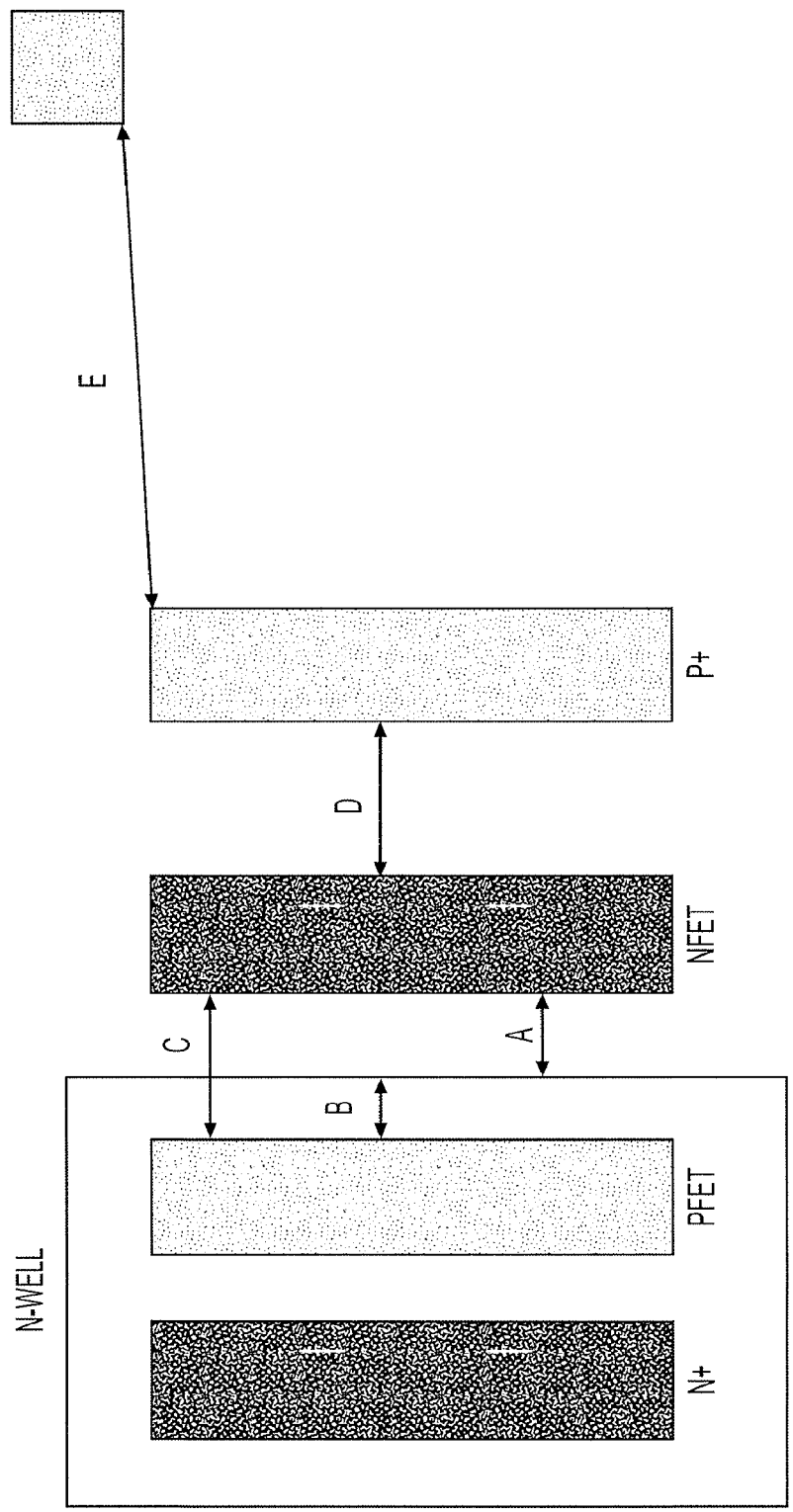
FIG. 3 is a diagram showing examples of spacings associated with various areas and components of an integrated circuit.

The present disclosure allows reduction in terms of the spacings associated with various areas (e.g., the core area and the I/O ring area) of an integrated circuit while mitigating latch-up even as the die is shrunk. FIG. 3 shows examples of spacings associated with various areas and components of an integrated circuit in accordance with one example. As part of the core area, example design rules that can be decreased include: (1) minimum N+ to N-Well spacing (spacing A); (2) minimum N-Well enclosure of P+(spacing B); (3) minimum N+ to P+ spacing (spacing C); (4) maximum P+P-Well Tap to N+ Active Region (spacing D); and (5) maximum allowed separation between P+ Well ties (spacing E). Although FIG. 3 shows a certain number of spacings and their respective locations in an integrated circuit, the present disclosure can be used to reduce or optimize additional or fewer spacings that may be located elsewhere in the integrated circuit. As an example, although FIG. 3 shows some dimensions that can be decreased when a process or die shrink is done, there are additional design rule dimensions which could be shrunk like the maximum allowed distance between the N+ N-Well tie and P+ active areas in N-Well regions.

Figure 4:
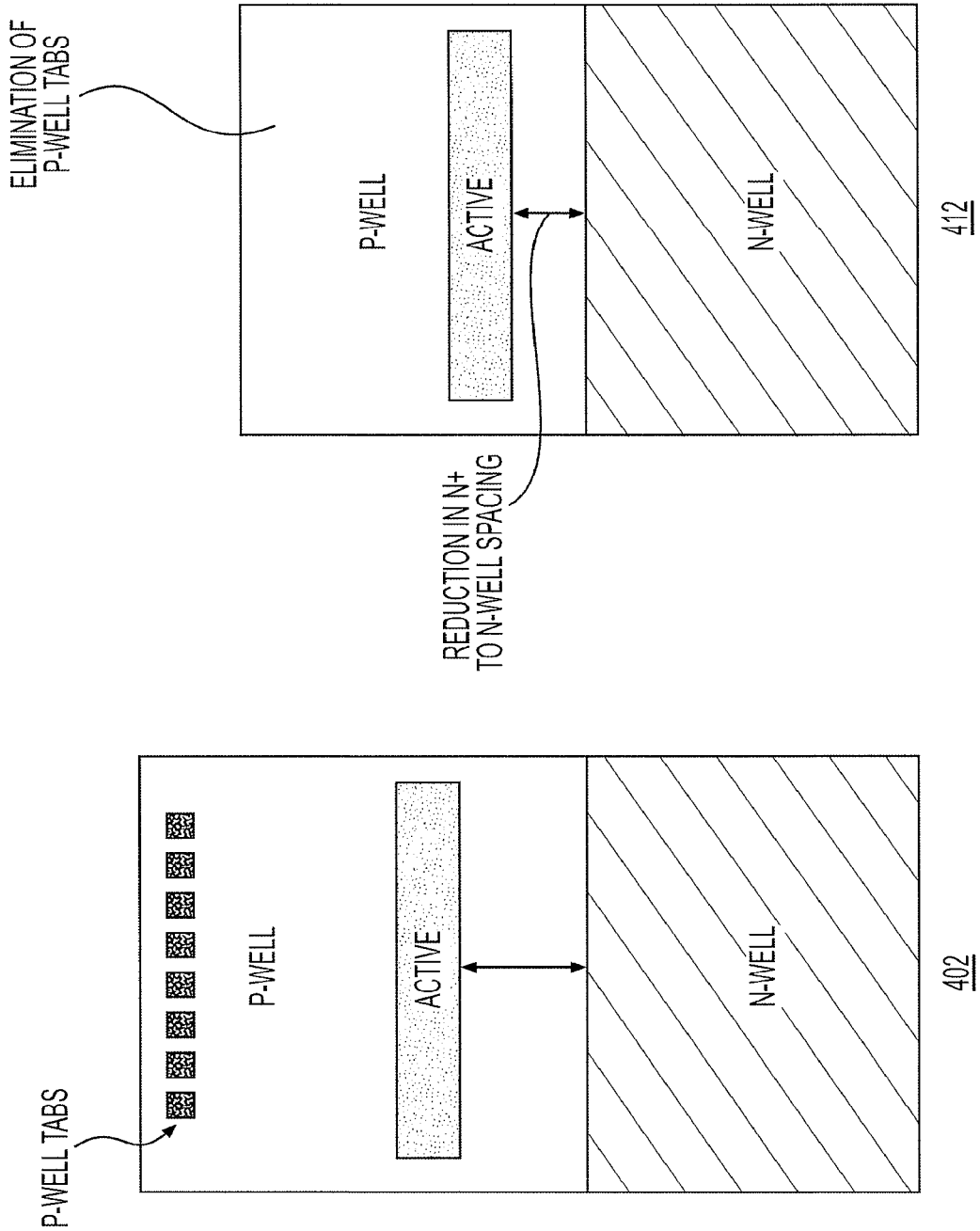
FIG. 4 is a diagram showing examples of reduction in spacings associated with various areas and components of an integrated circuit.

FIG. 4 is a diagram showing examples of reduction in spacings associated with various areas and components of an integrated circuit. As shown in FIG. 4, the use of latch-up mitigation structure(s) may allow the removal of P-well tabs resulting in shrinking of the die. In addition, the spacing between N-well and the external N+ active region of the integrated circuit may further be reduced.

Figure 5:
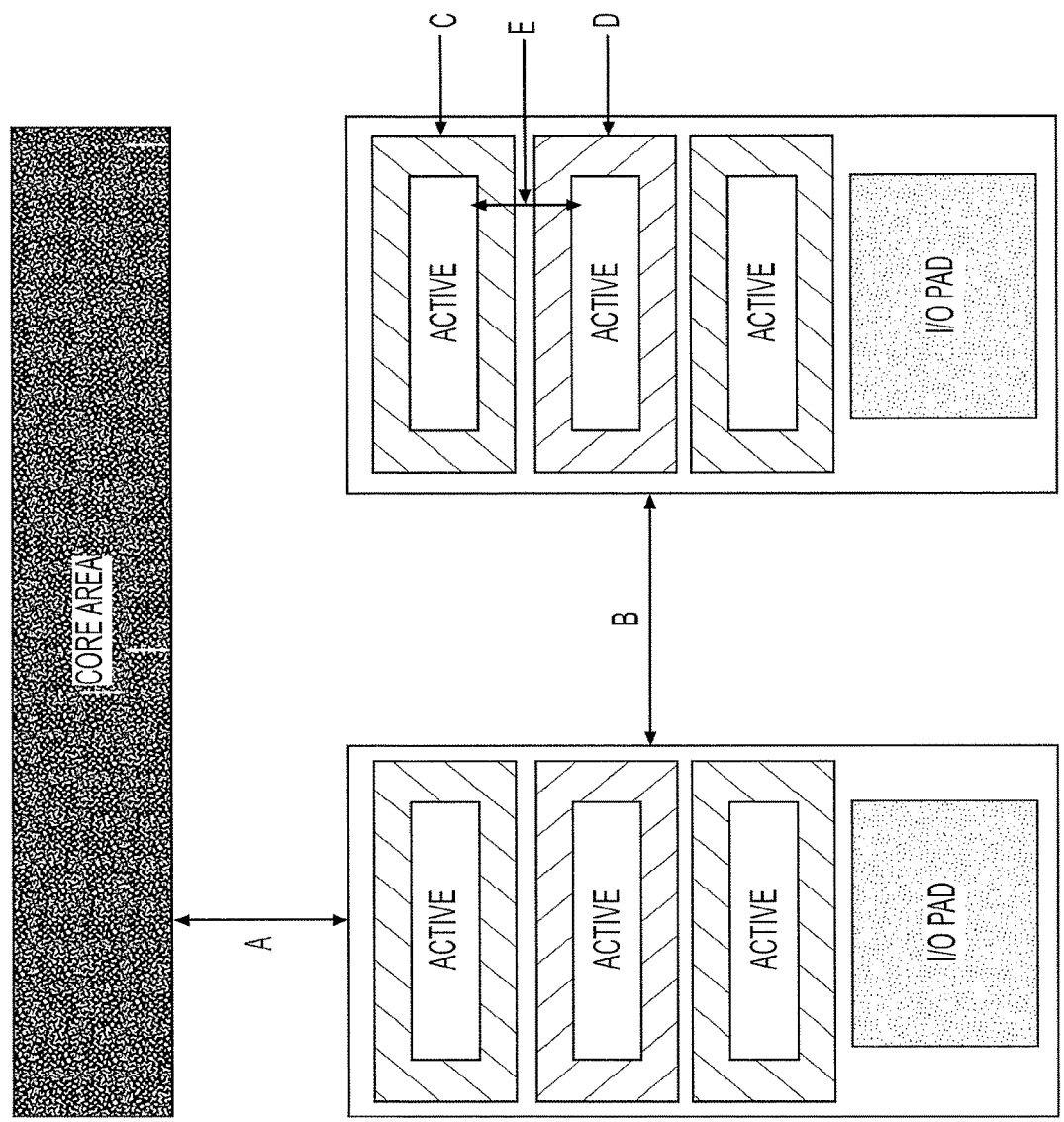
FIG. 5 is diagram showing examples of spacings for the I/O areas and components of an integrated circuit.

FIG. 5 shows examples of spacings for the I/O areas and components of an integrated circuit in accordance with one example. As part of the 1/O regions, the example design rules that can be decreased include: (1) minimum I/O to Internal Core spacing (A); (2) minimum spacing between 1/O pad regions (B); (3) minimum N-Well guard ring size and frequency (C); (4) minimum P-Well guard ring size and frequency (D); and (5) minimum allowed separation between N-Well and P-Well devices (E). Although FIG. 5 shows a certain number of spacings and their location in an integrated circuit, the present disclosure can be used to target additional or fewer spacings that may be located elsewhere in the integrated circuit. As an example, in addition to the dimensions shown in FIG. 5 other dimensions which could be decreased include the minimum allowed spacing between the I/O region and specific components of the core IP.

Figure 6:
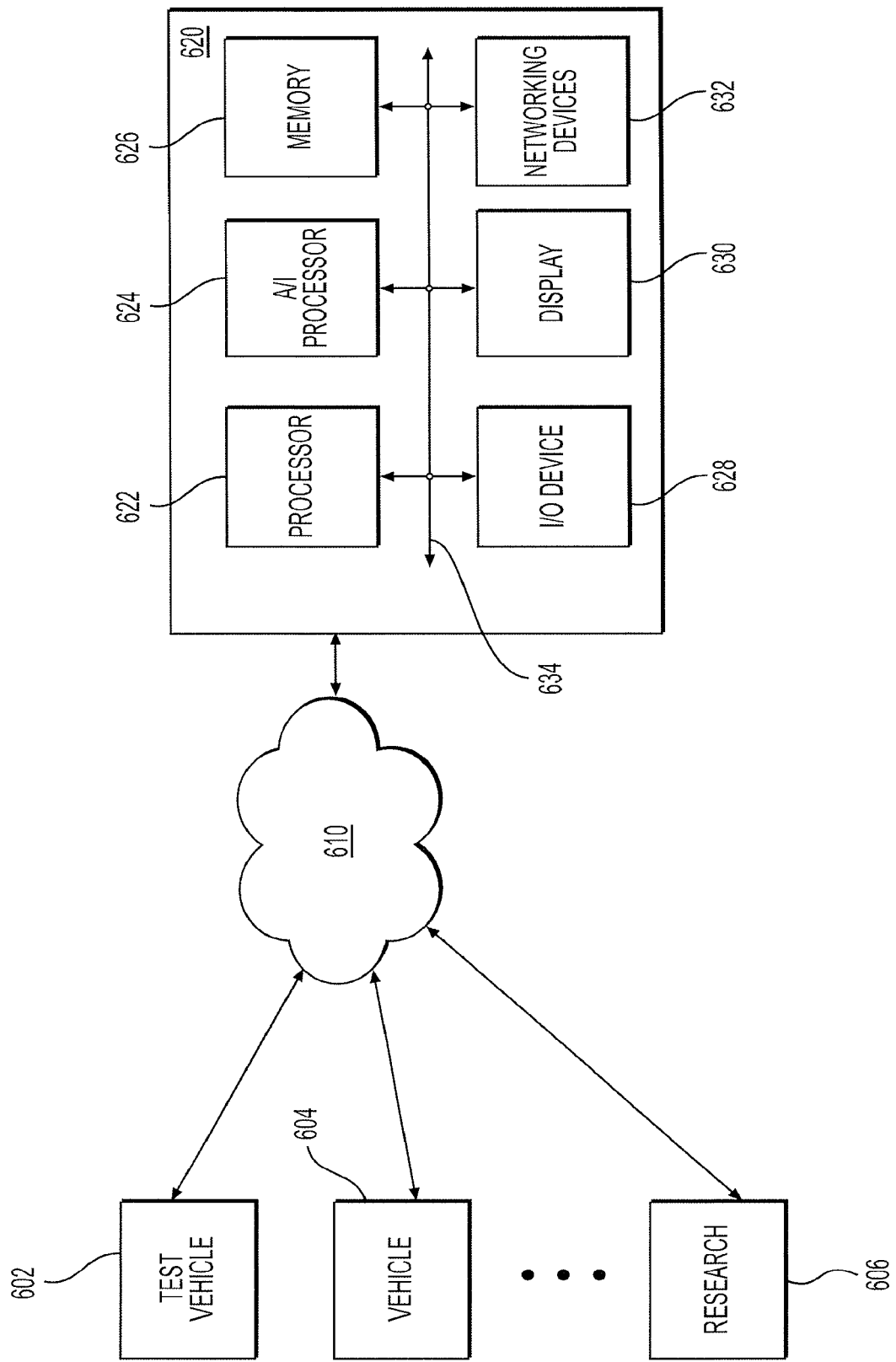
FIG. 6 is a diagram showing a system environment for a learning-based analyzer for mitigating latch-up in an integrated circuit in accordance with one example.

FIG. 6 is a diagram showing a system environment for a learning-based system (LBS) 620 for generating layout rules for mitigating latch-up in an integrated circuit in accordance with one example. LBS 620 may also be configured to generate a floor plan for an integrated circuit based on the layout rules. In this example, the system environment may include LBS 620 coupled to receive data and/or instructions from a variety of sources via a network 610. Network 610 may be a wired network, a wireless network, or a combination of both wired and wireless networks. Sources of data and/or instructions, including latch-up data may include a test vehicle 602, integrated circuit IP 604, or research 606. Supervised learning-based system 620 may include a processor 622, an artificial intelligence (A/I) processor 624, a memory 626, input/output (I/O) devices 628, display 630, and network devices 632. Each of these components may be connected to each other (as needed for the functionality of LBS 620) via a bus system 634. Processor 622 and A/I processor 624 may execute instructions stored in memory 626. Memory 626 may be any combination of non-volatile storage or volatile storage (e.g., flash memory, DRAM, SRAM, or other types of memories). I/O devices 628 may include devices such as a keyboard, a mouse, voice recognition processor, or touch screens. Display 630 may be any type of display, such as LCD, LED, or other types of display. Network devices 632 may include communication interfaces, such as Ethernet, cellular radio, Bluetooth radio, UWB radio, or other types of wireless or wired communication interfaces. Although FIG. 6 shows the system environment as including a certain number of components arranged and coupled in a certain way, the system environment may include fewer or additional components arranged and coupled differently. In addition, although FIG. 6 shows LBS 620 as including certain number of components arranged and coupled in a certain way, LBS 620 may include fewer or additional components arranged and coupled differently.

Figure 7:
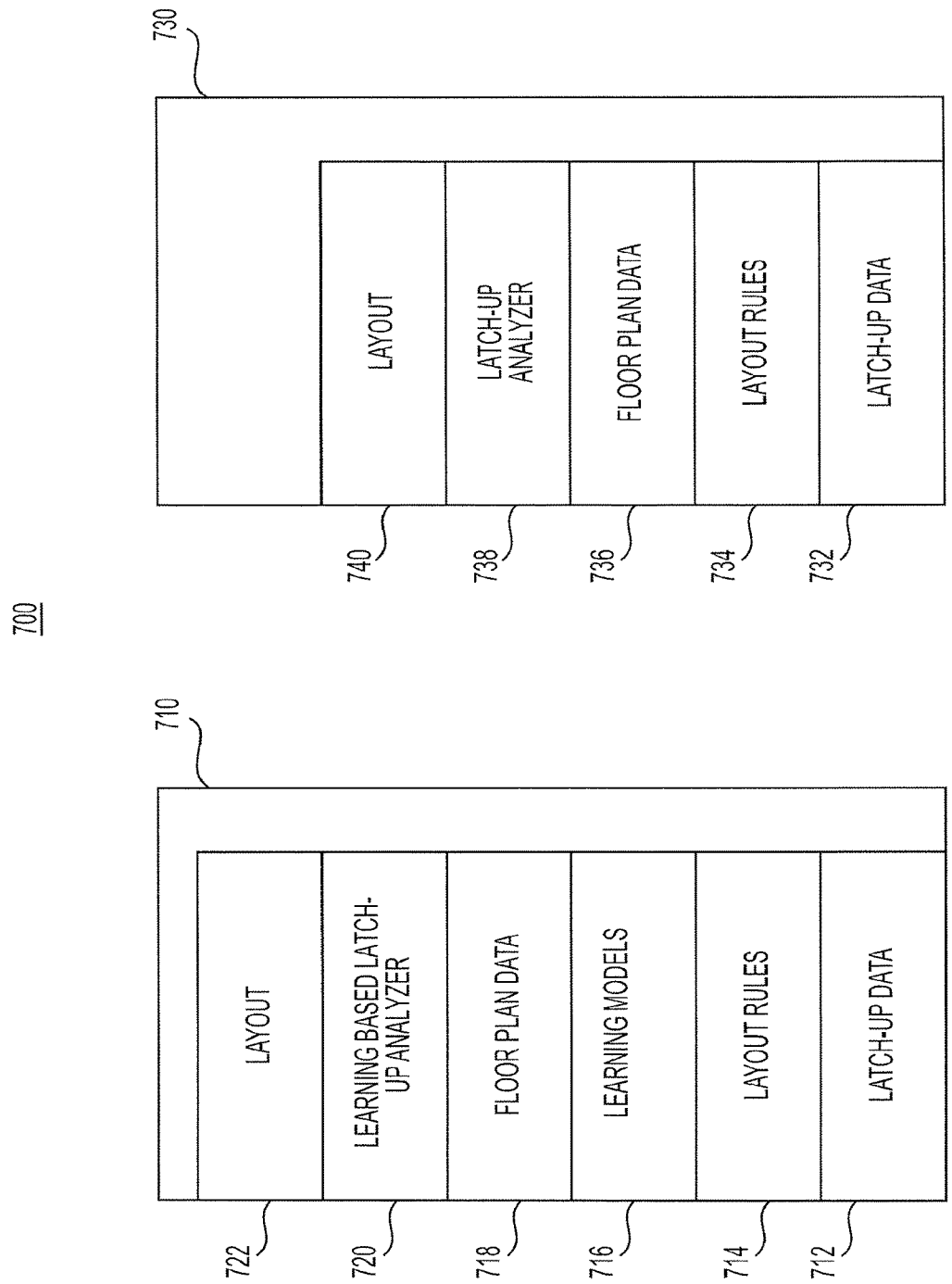
FIG. 7 is a diagram showing various instruction modules and data for use with the learning-based analyzer in accordance with one example.

FIG. 7 is a diagram showing an example 700 of various instructions and data for use with learning-based system 620 in accordance with one example. Memory 626 may include modules and instructions corresponding to the modules that when executed by processor 622 may allow the use of learning-based system 620 in accordance with one example. FIG. 7 shows two different examples of memory 626 (memory 710 and memory 730) for storing modules and data. Memory 710 may include latch-up data 712, layout rules 714, learning models 716, floor plan data 718, learning-based latch-up analyzer 720, and layout 722. Memory 730 may include similar modules and data, but some of the functionality of the modules may be provided in hardware by A/A processor 624 or other computational means internal or external to the system. Thus, memory 730 may include latch-up data 732, layout rules 734, floor plan data 736, latch-up analyzer 738, and layout 740.

Latch-up data may include data obtained from a test vehicle, integrated circuit IP, or from research. In this example, latch-up data may include models of each type of device, including parasitic devices, potentially involved in latch-up anywhere on the integrated circuit, before and/or after the latch-up is triggered. Thus, this data may include the amount of voltage that is required to drive a certain amount of current through the latched structures. As an example, an integrated circuit inside a test vehicle may be connected to telemetry equipment, like automated test equipment or semiconductor parametric analyzers, to obtain latch-up data at various operating temperatures associated with the integrated circuit. Voltage and/or current sweeps may be performed using such telemetry equipment at the different operating temperatures to obtain the latch-up data. Latch-up data may be obtained for both integrated circuits that have at least one cross-section similar to the one shown in FIG. 1 and integrated circuits that have at least one cross-section similar to the one shown in FIG. 2.

Layout rules may be used to store an initial set of layout rules for the parameters corresponding to an integrated circuit that is being analyzed. Some of the layout rules may relate to the layout rules described with respect to FIGS. 1-5. Layout rules may also store the layout rules generated by LBS 620 or a component of LBS 620.

Floor plan data may include data that can be used to create a layout for an integrated circuit. In one example, after LBS 620 has generated the layout rules, the floor plan may be generated based on the layout rules and other information needed for creating the layout for the integrated circuit. As an example, this information may relate to rules or other types of information concerning the layers of metal and the dimensions of the metal lines, the polysilicon layers and the dimensions of the polysilicon layers. Indeed, other information related to creating a floor plan for the integrated circuit being designed may also be used.

With continued reference to FIG. 7, for the example of memory 710, learning-based latch-up analyzer (LBLA) 720 may implement a learning algorithm that can be trained based on input data, and, once it is trained, it can make predictions or prescriptions based on the training. In this example, LBLA 720 may implement techniques such as Linear Regression, Support Vector Machine (SVM) set up for regression, Random Forest set up for regression, Gradient-boosting trees set up for regression and neural networks. Linear regression may include modeling the past relationship between latch-up related independent variables (e.g., doping and temperature) and dependent output variables (e.g., trigger current and holding voltage) to help predict values of such output variables for any set of independent variable values. Neural networks may include artificial neurons used to create an input layer, one or more hidden layers, and an output layer. Each layer may be encoded as matrices or vectors of weights expressed in the form of coefficients or constants that might have been obtained via off-line training of the neural network. Neural networks may be implemented as Recurrent Neural Networks (RNNs), Long Short Term Memory (LSTM) neural networks, or Gated Recurrent Unit (GRUs). All of the information required by a learning-based model may be translated into vector representations corresponding to any of these techniques. Taking the LSTM example, an LSTM network may comprise a sequence of repeating RNN layers or other types of layers. Each layer of the LSTM network may consume an input at a given time step, e.g., a layer's state from a previous time step, and may produce a new set of outputs or states. In case of using the LSTM, a single chunk of content may be encoded into a single vector or multiple vectors. As an example, selection of data taken at a single temperature or for a consistent set of layout rules may be encoded as a single vector. Each chunk may be encoded into an individual layer (e.g., a particular time step) of an LSTM network. An LSTM layer may be described using a set of equations, such as the ones below:

$$i_t = \sigma(W_{xi}x_t + W_{hi}h_{t-1} + W_{ci}c_{t-1} + b_i)$$

$$f_t = \sigma(W_{xf}x_t + W_{hf}h_{t-1} + W_{cf}c_{t-1} + b_f)$$

$$c_t = f_t c_{t-1} i_t \tanh(W_{xc}x_t + W_{hc}h_{t-1} + b_c)$$

$$o_t = \sigma(W_{xo}x_t + W_{ho}h_{t-1} + W_{co}c_t + b_o)$$

$$h_t = o_t \tanh(c_t)$$

In this example, inside each LSTM layer, the inputs and hidden states may be processed using a combination of vector operations (e.g., dot-product, inner product, or vector addition) or non-linear operations, if needed.

LBLA 720 may have two parts: the first part may produce layout rules and the second part may produce the layout. The layout section may use the output of the rules section to optimize the layout of a given set of standard cells.

This can be done, for example, using reinforcement learning where the "environment" is comprised of digital logic to be synthesized with the standard cells along with module layouts. Points may be awarded for actions like minimizing a characteristic like the area of a specified set of cells or the input/output ring area, or maximizing a characteristic like speed while still obeying the latch-up related rules.

LBLA 720 may predict for a given node size, based on the latch-up requirements or data, at least one of: (1) internal latch-up rules to minimize die size; (2) I/O latch-up rules to minimize die size; (3) standard cell and analog layouts driven by the internal latch-up rules; (4) I/O library cell layouts driven by the I/O latch-up rules; (5) I/O library cell layouts driven by the I/O latch-up rules for the pads where they will be used; and (6) the integrated circuit floorplan, internal spacings, I/O spacings and internal-to-I/O spacings, to minimize die size at that node. Each of these dependent variables may be predicted for both integrated circuits that have a cross-section similar to the one shown in FIG. 1 and integrated circuits that have a cross-section similar to the one shown in FIG. 2.

With continued reference to FIG. 7, memory 730 may relate to a situation where the models and the code are provided as part of the hardware corresponding to the A/I processor or another computational resource. In the case of A/I processor 624, some or all of the functionality associated with the learning-based latch-up analyzer may be hard-coded or otherwise provided as part of A/I processor 624. As an example, A/I processor may be implemented using an FPGA with the requisite functionality.

Figure 8:
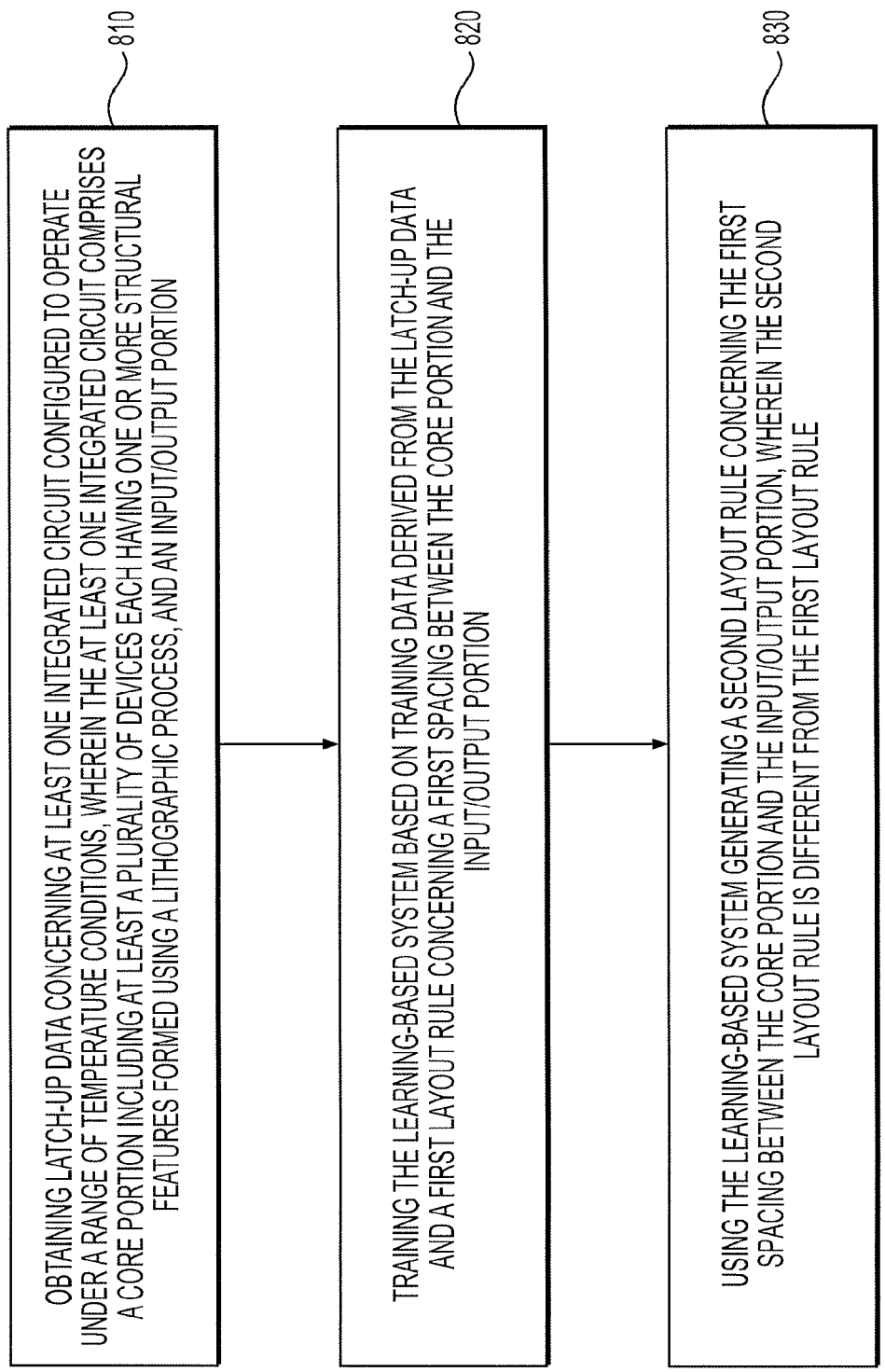
FIG. 8 is a flow chart of a method in accordance with another example.

FIG. 8 is a flow chart of a method in accordance with another example. In one example, the steps shown in this flow chart may be performed using LBS 620. Step 810 may include obtaining latch-up data concerning at least one integrated circuit configured to operate under a range of temperature conditions, where the at least one integrated circuit has a core portion including at least a plurality of devices each having one or more structural features formed using a lithographic process, and an input/output portion. The latch-up data may be limited to only the latch-up data for the core(s) of the integrated circuit (e.g., core rules only), or only the I/O area of the integrated circuit (I/O rules only). The latch-up data may also include data for different integrated circuits, including multiple integrated circuits. As described earlier, with respect to FIGS. 6 and 7, latch-up data may include data obtained from a test vehicle, integrated circuit IP, or from research. In this example, latch-up data may include the trigger voltage for each type of structure, such as an inverter in an integrated circuit that can cause the device to latch-up. In addition, latch-up data may further include the data related to the behavior of a structure once it latches. Thus, this data may include the amount of voltage that is required to drive a certain amount of current through the structure if it latches. In this example, processor 622 of LBS 620 may execute instructions to obtain the latch-up data in response to an input from a user or otherwise.

Step 820 may include training the learning-based system based on training data derived from the latch-up data and a first layout rule concerning a first spacing between the core portion and the input/output portion. This step may include labeling the various types of latch-up data as inputs that may be processed by LBS 620. Then, as described earlier, the neural network may be trained to process the inputs and generate expected outputs. Coefficients or constants obtained via this process may be derived based on the training data, which may include labeled inputs. An example of a possible set of labeled inputs is (distance to nearest P-Well tap, distance to N-Well tap of the nearest N-Well, distance to closest P-Well/N-Well boundary, distances to closest I/O P-Well boundary and I/O P-Well tie, distances to closest I/O N-Well boundary and I/O N-Well tie, Core P-Well doping, Core N-Well doping, I/O P-Well doping, I/O N-Well doping, Core VDD, I/O VDD, Latch-up Trigger Voltage, Latch-up Trigger Current, Latch-up Holding Voltage, Latch-up Holding Current, presence or absence of the BGR implants, BGR doping characteristics, Distance to nearest vertical BGR tap if present, temperature). The system can be trained using these sets of input data, for example, by methods such as linear regression, nonlinear regression and response surface methods.

Step 830 may include using the learning-based system to generate a second layout rule concerning the first spacing between the core portion and the input/output portion, where the second layout rule is different from the first layout rule. This step may be performed by LBS 620. This step may include performing linear regression or other types of operations described earlier to generate layout rules that achieve the desired outcome. Although FIG. 8 shows certain number of steps being performed in a certain order, this method may include more or fewer steps performed in a different order. As an example, although step 830 relates to the spacing between the core portion and the input/output portion, which corresponds to spacing A of FIG. 5, other layout rules concerning the other spacings shown in FIG. 5 may also be generated. In addition, a single layout rule may be generated concerning spacings such as, spacing A, spacing B, spacing C, spacing D, and spacing E shown in FIG. 5. Moreover, as needed, LBS 620 may be configured to generate a layout rule that may specify whether the P-well tabs shown in FIG. 4 may be eliminated and thereby shrinking the die.

Figure 9:
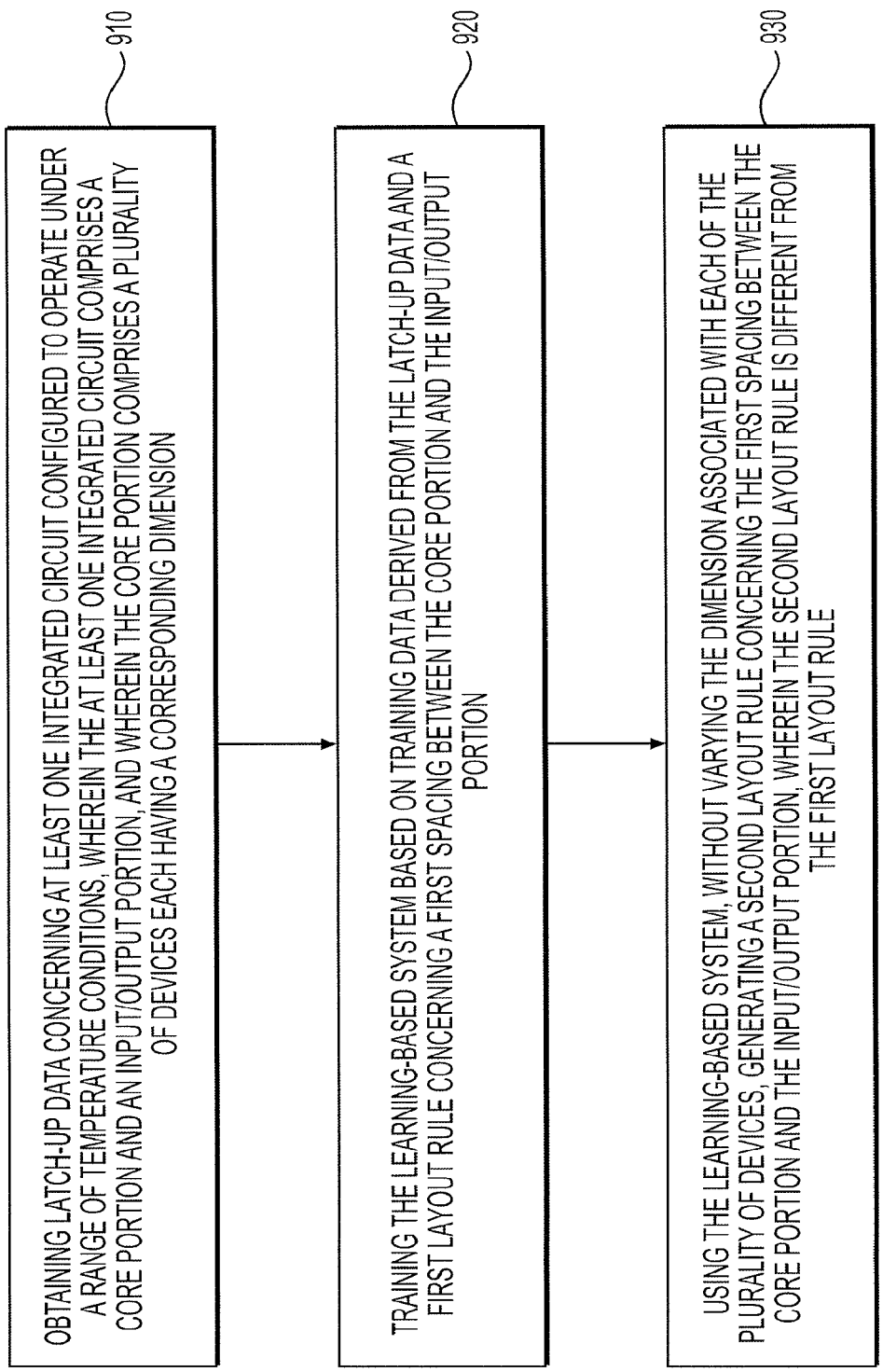
FIG. 9 is a flow chart of a method in accordance with another example.

FIG. 9 is a flow chart of a method in accordance with another example. In one example, the steps shown in this flow chart may be performed using LBS 620. Step 910 may include obtaining latch-up data concerning at least one integrated circuit configured to operate under a range of temperature conditions, where the at least one integrated circuit includes a core portion and an input/output portion, and where the core portion includes a plurality of devices each having a corresponding dimension. The latch-up data may be limited to only the latch-up data for the core(s) of the integrated circuit (e.g., core rules only), or only the I/O area of the integrated circuit (I/O rules only), or the latch-up data may include both. The latch-up data may also include data for different integrated circuits, including multiple integrated circuits. As described earlier, with respect to FIGS. 6 and 7, latch-up data may include data obtained from a test vehicle, integrated circuit IP, or from research. In this example, latch-up data may include the trigger voltage for each type of structure, such as an inverter in an integrated circuit that can cause the device to latch-up. In addition, latch-up data may further include the data related to the behavior of a structure once it latches. Thus, this data may include the amount of voltage that is required to drive a certain amount of current through the structure if it latches. In this example, processor 622 of LBS 620 may execute instructions to obtain the latch-up data in response to an input from a user or otherwise.

Step 920 may include training the learning-based system based on training data derived from the latch-up data and a first layout rule concerning a first spacing between the core portion and the input/output portion. This step may include labeling the various types of latch-up data as inputs that may be processed by LBS 620. Then, as described earlier, the neural network may be trained to process the inputs and generate expected outputs. Coefficients or constants obtained via this process may be derived based on the training data, which may include labeled inputs. An example of a possible set of labeled inputs is (distances to closest I/O P-Well boundary and I/O P-Well tie, distances to closest I/O N-Well boundary and I/O N-Well tie, Core P-Well doping, Core N-Well doping, I/O P-Well doping, I/O N-Well doping, Core VDD, I/O VDD, Latch-up Trigger Voltage, Latch-up Trigger Current, Latch-up Holding Voltage, Latch-up Holding Current, presence or absence of BGR implants, BGR doping characteristics, distance to nearest vertical BGR tap if present, temperature). The system can be trained using these sets of input data, for example, by methods such as linear regression, nonlinear regression and response surface methods.

Step 930 may include using the learning-based system, without varying the dimension associated with each of the plurality of devices, generating a second layout rule concerning the first spacing between the core portion and the input/output portion, where the second layout rule is different from the first layout rule. This step may be performed by LBS 620. This step may include performing linear regression or other types of operations described earlier to generate layout rules that achieve the desired outcome. Although FIG. 9 shows certain number of steps being performed in a certain order, this method may include more or fewer steps performed in a different order. As an example, although steps 920 and 930 relate to the spacing between the core portion and the input/output portion, which corresponds to spacing A of FIG. 5, other layout rules concerning the other spacings shown in FIG. 5 may also be generated. In addition, a single layout rule concerning spacings such as, spacing A, spacing B, spacing C, spacing D, and spacing E, as shown in FIG. 5, may be generated. Moreover, as needed, LBS 620 may be configured to generate a layout rule that may specify whether the P-well tabs shown in FIG. 4 may be eliminated and thereby shrinking the die.

Figure 10:
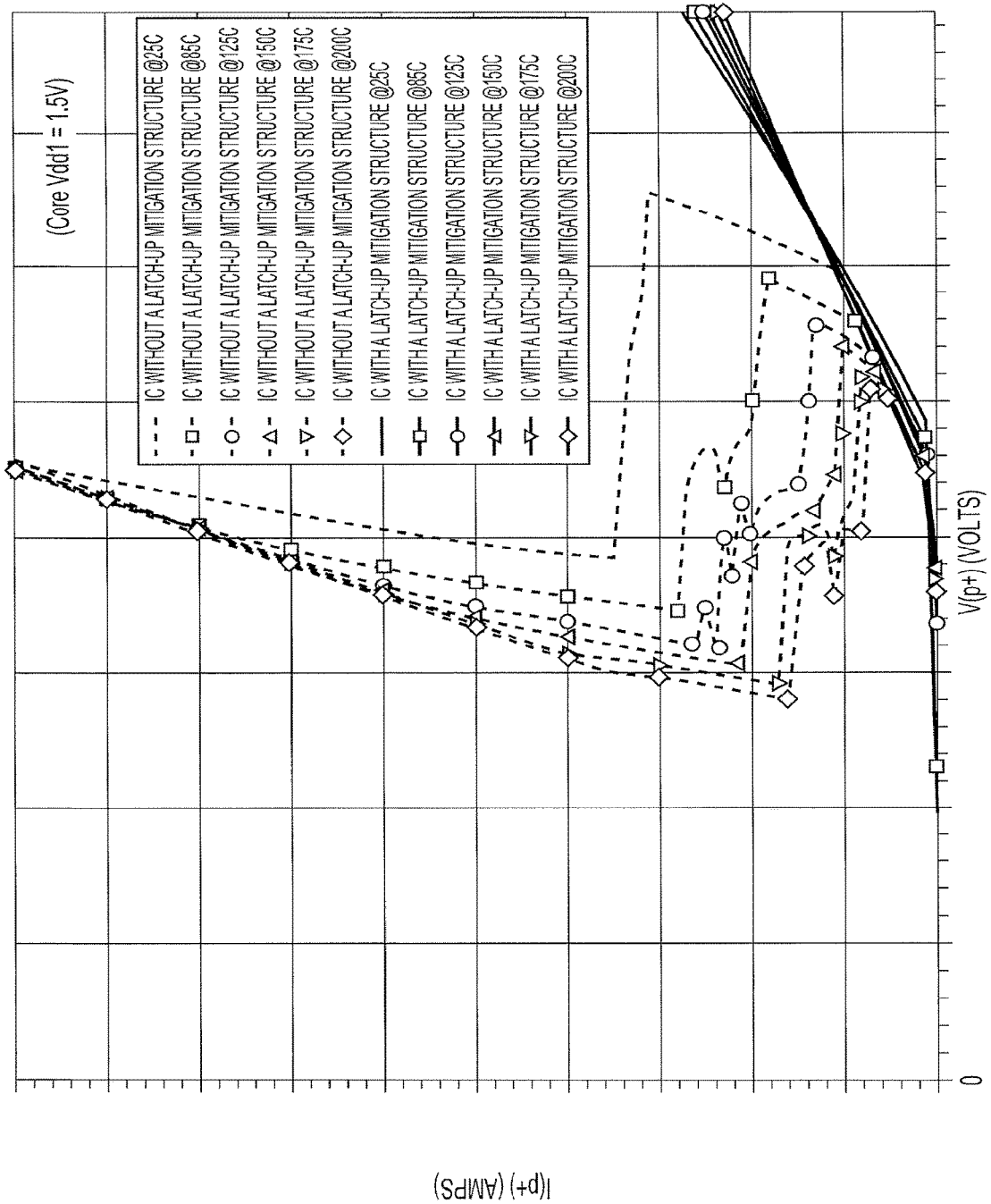
FIG. 10 shows latch-up characterization of an integrated circuit without any latch-up mitigation structure and an integrated circuit with a latch-up mitigation structure in accordance with one example.

FIG. 10 shows latch-up characterization of an integrated circuit without any latch-up mitigation structure and an integrated circuit with a latch-up mitigation structure in accordance with one example. In this example, the characterization related to the voltage sweeps is performed at temperatures from 25 degrees Centigrade to 200 degrees Centigrade. For all the sweeps, in this example, for the integrated circuit without the latch-up mitigation structure(s), once the P+/N-Well emitter is forward-biased enough to trigger the NPN, the structure latches; the voltage required to maintain increasing amounts of current through it falls to a minimum value before the structure enters a low impedance state, and as a result, a smaller amount of voltage is needed to drive a large current through it than was needed to initiate the latch. For example, at 125 degrees Centigrade, it takes only about 80% of the voltage required for the device to latch-up to drive much larger currents through the low-impedance latched structure. In contrast, once the latch-up mitigation structures were implemented (e.g., the BGR noted earlier), in this example, it was not possible to trigger the latch. Thus, the curves labelled "IC WITH A LATCH-UP MITIGATION STRUCTURE" show that the structure never enters the latched, low-impedance state. Thus, with the use of the latch-up mitigation structures improving the latch-up behavior of the integrated circuits, one may advantageously perform selective shrink of the die using any of the systems and methods described earlier.

Figure 11:
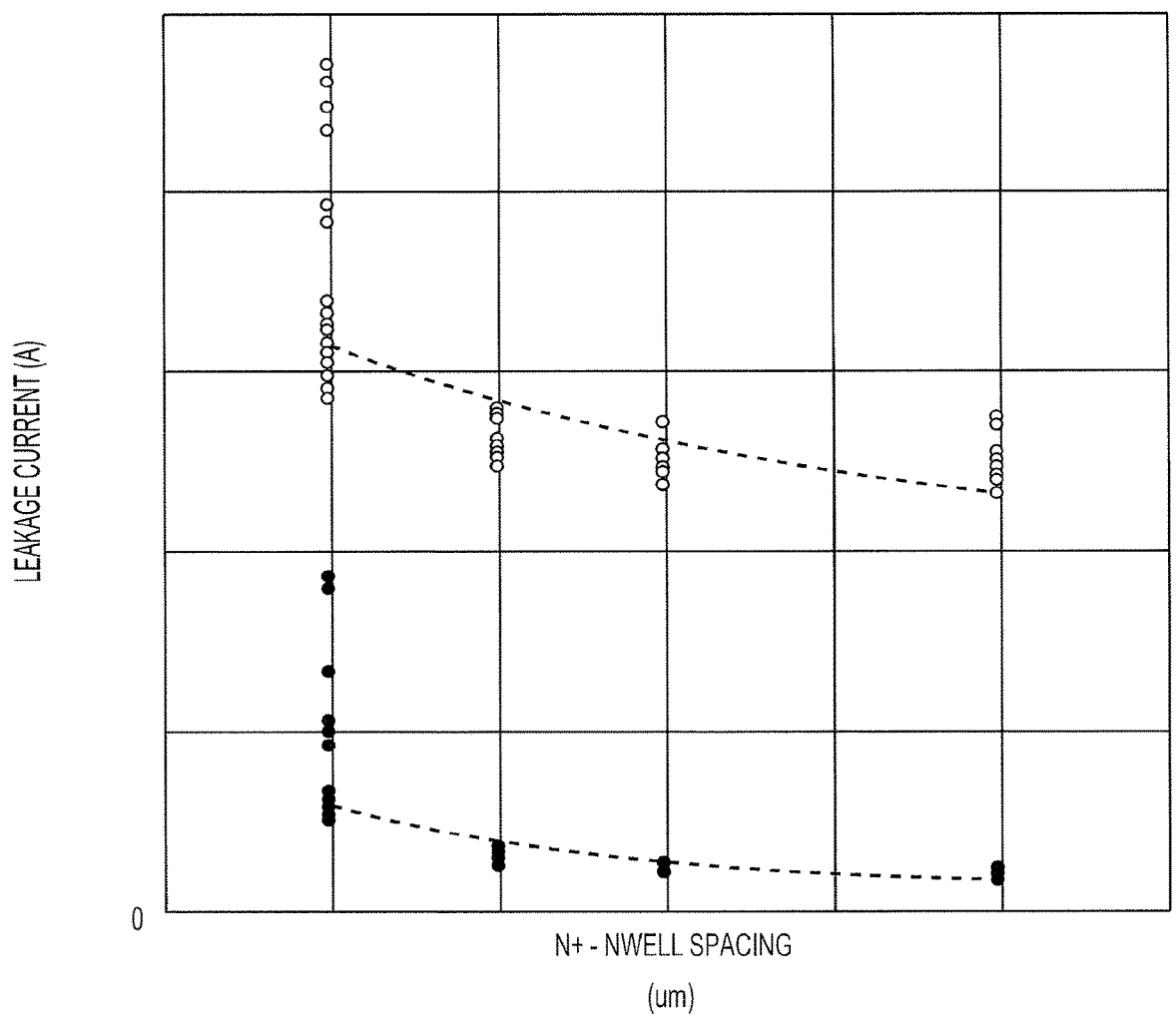
FIG. 11 shows N-well leakage characterization based on spacing at a certain operating temperature in accordance with one example.

FIG. 11 shows N+ Source/Drain to N-well leakage characterization based on spacing at a certain operating temperature in accordance with one example. Once again, the N-well leakage is not as pronounced for the IC with a latch-up mitigation structure compared with the IC without a latch-up mitigation structure. Reducing the minimum allowed separation between the N-Well and N+ Source/Drain regions external to it, as allowed by the latch-up immunity demonstrated above, may increase the power consumption by the integrated circuit through leakage between the N-Well and N+ Source/Drain regions. As the N+ Source/Drain and N-Well are brought closer together, in the devices without the guard ring the measured leakage current increases. Once, however, the latch-up mitigation regions are implemented, the change in doping profile beneath the shallow trench isolation (STI) between the N+ Source/Drain and N-Well decreases the electric field at the N-Well Edge and, thus, this may advantageously decrease the leakage current to a magnitude less than the leakage current without the latch-up mitigation structure. This in turn enables the minimum allowed N+ Source/Drain to N-Well separation to be decreased, further decreasing the size of the integrated circuit.

Figure 12:
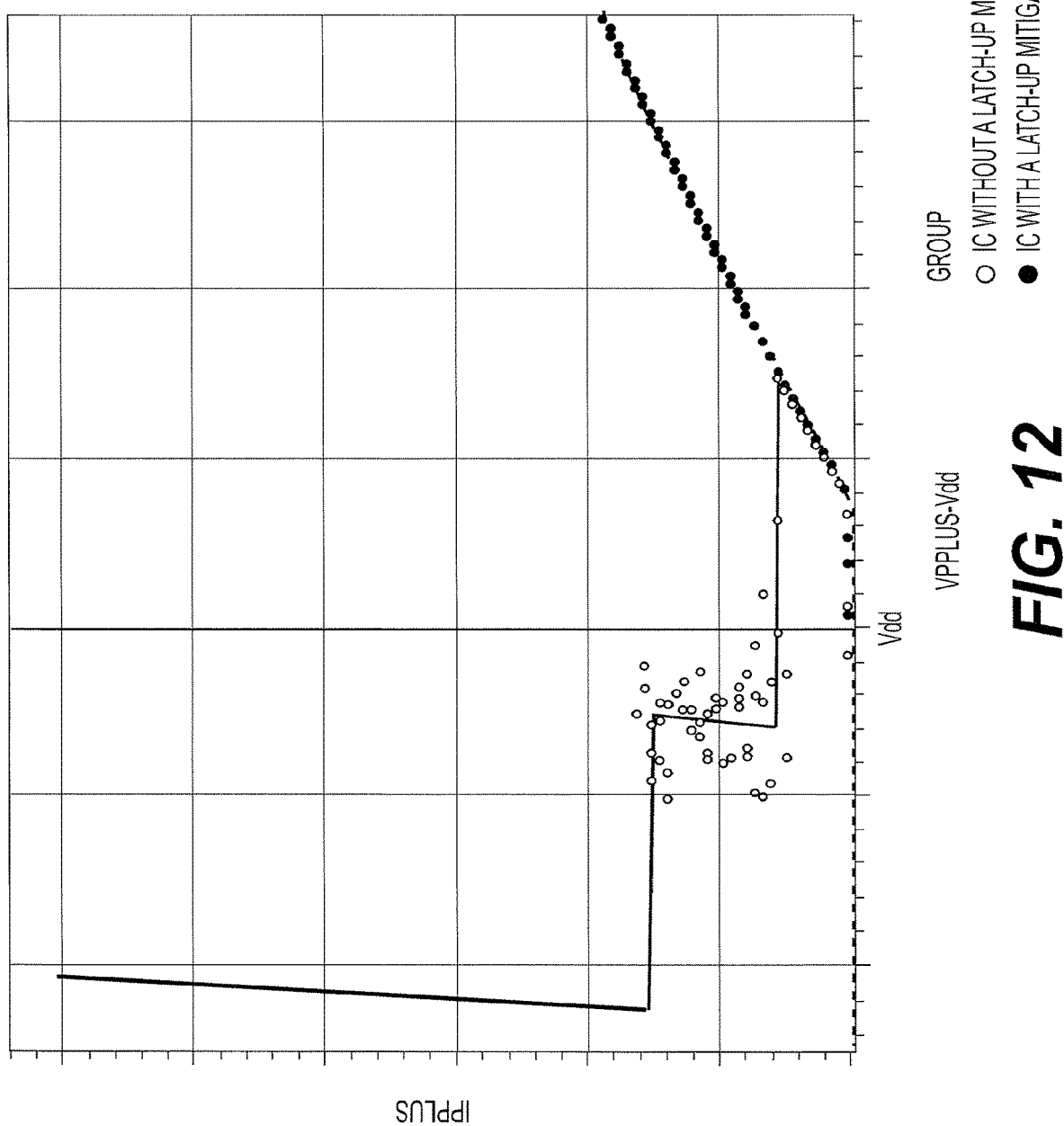
FIG. 12 shows latch-up characterization of an integrated circuit without any latch-up mitigation structure and an integrated circuit with a latch-up mitigation structure in accordance with yet another example.

Similarly, FIG. 12 shows latch-up characterization of an integrated circuit without any latch-up mitigation structure and an integrated circuit with a latch-up mitigation structure in accordance with yet another example. In this example, when the maximum allowed distance to the P-well tie is used, the IC without a latch-up mitigation structure latches-up, but the IC with the latch-up mitigation structure does not latch-up. By performing these characterizations, additional latch-up data, including corresponding trigger voltages and spacing information may be obtained. This information can then be used to train a neural network-based system, another type of learning-based system, or as an input to a calculation system. That in turn can allow further improvements in the ability of the designers to shrink die area and yet not have latch-up occur even in harsh operating conditions.

In addition, because of the protection afforded by the heavily doped BGR regions, several of the separations mandated by the original layout design rules can be decreased. This enables high device density and reduced IC size without modification of the devices themselves.

The present disclosure may offer several advantages over simple optical shrinks and systems and methods for designing integrated circuits in a way that results in smaller die area and latch-up mitigation. In an optical shrink the uniform application of a scale factor causes both device dimensions and inter-device distances to be reduced. This means the shrunk devices are either closer to or outside the limits of the existing device models even if slight adjustments to doping profiles are made to attempt to compensate for the shrink. Modeling the shrunken devices and re-simulating the operation of the integrated circuit may increase the cost of the integrated shrink and potentially bring it closer to the cost of designing a new integrated circuit from scratch.

If the new distributions of device parameters are outside the modeling limits, there may be increased functional and parametric yield loss. One area where this yield loss is probable is in Power Consumption in STOP and RUN mode. If the new distributions of device parameters are still inside the modeling limits, production control may need to be tightened to avoid increasing yield loss. If the manufacturing yield declines, either for every lot or with intermittent "yield busts," the financial benefit of the shrink can be decreased or eliminated.

The decrease in inter-device separation can reduce device-to-device isolation. This can lead to increased leakage between devices and between devices and external wells, as well as potential functional failures caused by Latch-up and ESD. The device separation issues often pose very significant hurdles to the shrink since the original design rules were usually set as aggressively as possible for the original node and process.

As part of certain examples of the present disclosure, the device dimensions remain unchanged. This eliminates the issues associated with scaled device dimensions. In these examples, existing IP will continue to function as it did on the original IC since its constituent devices are unchanged. In certain examples of the present disclosure, the change in IC area is brought about by decreasing inter-device spacing. The heavily doped implants described earlier can be used to eliminate the occurrence of latch-up and improve ESD performance.

In addition, the present disclosure may provide advantages over core-only optical shrinks as well. This is because in addition to selective shrinking of dimensions in the core, the present disclosure also enables the I/O regions and the spacing between the core and the I/O regions to be shrunk without decreasing the robustness of the protection these regions offer.

As part of the selective shrink approach not all regions of the die may be shrunk equally. However, in certain examples, the device dimensions are not altered leaving the existing device models and IP performance unchanged. As a result, with the examples provided in the present disclosure, the reduction of inter-device spacings does not result in a corresponding reduction in the robustness of the IP because of the inserted implants.

In conclusion, the present disclosure relates to a method, implemented by a learning-based system comprising at least one processor. The method may include obtaining latch-up data concerning at least one integrated circuit configured to operate under a range of temperature conditions, and the at least one integrated circuit may comprise a core portion including at least a plurality of devices each having one or more structural features formed using a lithographic process, and an input/output portion. The method may further include training the learning-based system based on training data derived from the latch-up data and a first layout rule concerning a first spacing between the core portion and the input/output portion. The method may further include using the learning-based system generating a second layout rule concerning the first spacing between the core portion and the input/output portion, and the second layout rule may be different from the first layout rule.

The at least one integrated circuit may further comprise a first input/output pad and a second input/output pad, and the training data may further be derived from a third layout rule concerning a second spacing between the first input/output pad and the second input/output pad. The method may further include using the learning-based system generating a fourth layout rule concerning the second spacing between the first input/output pad and the second input/output data, and the fourth layout rule may be different from the third layout rule. These steps may be performed concurrently with the steps associated with the first layout rule and the second layout rule.

The at least one integrated circuit may further comprise a first well having a first doping type and a second well having a second well having a second doping type, and a buried guard ring may be formed below the first well and the second well, and the training data may further be derived from a fifth layout rule concerning at least one dimension associated with the buried guard ring. The method may further include using the learning-based system generating a sixth layout rule concerning the at least one dimension associated with the buried guard ring, and the sixth layout rule may be different from the fifth layout rule. These steps may be performed concurrently with the steps associated with the first layout rule, the second layout rule, the third layout rule, and the fourth layout rule.

The first well may comprise a plurality of a first type of devices and the second well comprises a plurality of a second type of devices, and the training data may be derived from a seventh layout rule concerning a first minimum spacing between two of the plurality of the first type of devices and a second minimum spacing between two of the plurality of the second type of devices. The method may further comprise using the learning-based system generating an eighth layout rule concerning the first minimum spacing and the second minimum spacing, and the eighth layout rule may be different from the seventh layout rule. These steps may be performed concurrently with the steps associated with the first layout rule, the second layout rule, the third layout rule, the fourth layout rule, the fifth layout rule, and the sixth layout rule.

The method may further include, based at least on the second layout rule, the fourth layout rule, the sixth layout rule, and the eighth layout rule, but not based on the first layout rule, the third layout rule, the fifth layout rule, and the seventh layout rule, generating control data for controlling formation of a plurality of masks configured to form a plurality of patterned layers.

In another aspect, the present disclosure relates to a learning-based system including at least one processor and at least one memory. The memory may include instructions to obtain latch-up data concerning at least one integrated circuit configured to operate under a range of temperature conditions, where the at least one integrated circuit comprises a core portion including at least a plurality of devices each having one or more structural features formed using a lithographic process, and an input/output portion. The memory may include instructions to train the learning-based system based on training data derived from the latch-up data and a first layout rule concerning a first spacing between the core portion and the input/output portion. The memory may further include instructions to, using the learning-based system, generate a second layout rule concerning the first spacing between the core portion and the input/output portion, where the second layout rule is different from the first layout rule.

The at least one integrated circuit further may comprise a first input/output pad and a second input/output pad, and the training data may further be derived from a third layout rule concerning a second spacing between the first input/output pad and the second input/output pad. The system may further include instructions to, using the learning-based system, generate a fourth layout rule concerning the second spacing between the first input/output pad and the second input/output data, and the fourth layout rule may be different from the third layout rule.

The at least one integrated circuit may further comprise a first well having a first doping type and a second well having a second well having a second doping type, and a buried guard ring may be formed below the first well and the second well, and the training data may further be derived from a fifth layout rule concerning at least one dimension associated with the buried guard ring. The system may further include instructions to, using the learning-based system, generate a sixth layout rule concerning the at least one dimension associated with the buried guard ring, wherein the sixth layout rule is different from the fifth layout rule.

The first well may further comprise a plurality of a first type of devices and the second well comprises a plurality of a second type of devices, and the training data may further be derived from a seventh layout concerning a first minimum spacing between two of the plurality of the first type of devices and a second minimum spacing between two of the plurality of the second type of devices. The system may further include instructions to, using the learning-based system, generate an eighth layout rule concerning the first minimum spacing and the second minimum spacing, and the eighth layout rule may be different from the seventh layout rule.

The system may further include instructions to, based at least on the second layout rule, the fourth layout rule, the sixth layout rule, and the eighth layout rule, but not based on the first layout rule, the third layout rule, the fifth layout rule, and the seventh layout rule, generate control data for controlling formation of a plurality of masks configured to form a plurality of patterned layers corresponding to an instance of the at least one integrated circuit.

In yet another aspect, the present disclosure relates to a method, implemented by a learning-based system comprising at least one processor. The method may include obtaining latch-up data concerning at least one integrated circuit configured to operate under a range of temperature conditions, where the at least one integrated circuit comprises a core portion and an input/output portion, and where the core portion comprises a plurality of devices each having a corresponding dimension. The method may further include training the learning-based system based on training data derived from the latch-up data and a first layout rule concerning a first spacing between the core portion and the input/output portion. The method may further include using the learning-based system, without varying the dimensions associated with each of the plurality of devices, generating a second layout rule concerning the first spacing between the core portion and the input/output portion, where the second layout rule is different from the first layout rule.

The integrated circuit may further include a first input/output pad and a second input/output pad, and the training data may further be derived from a third layout rule concerning a second spacing between the first input/output pad and the second input/output pad. The method may further include using the learning-based system generating a fourth layout rule concerning the second spacing between the first input/output pad and the second input/output data, wherein the fourth layout rule is different from the third layout rule. The method may further include, based at least on the second layout rule and the fourth layout rule, generating control data for controlling formation of a plurality of masks configured to form a plurality of patterned layers.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with the examples described in this disclosure can also include instructions stored in a non-transitory media, e.g., memory 626 of FIG. 6 or other types of non-transitory media. The term "non-transitory media" as used herein refers to any media storing data and/or instructions that cause a machine, such as processor 622 or A/I processor 624, to operate in a specific manner. Exemplary non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory, such as DRAM, SRAM, a cache, or other such media. Non-transitory media is distinct from, but can be used in conjunction with, transmission media. Transmission media is used for transferring data and/or instruction to or from a machine, such as processor 100. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to a specific example are not intended to be construed as a critical, required, or essential feature or element of any or all the claims. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method, implemented by a learning-based system comprising at least one processor, the method comprising:
obtaining latch-up data concerning an integrated circuit, wherein the integrated circuit comprises at least a first portion and a second portion;
training the learning-based system based on training data derived from the latch-up data and a first layout rule concerning a first spacing between the first portion and the second portion; and
generating a second layout rule concerning the first spacing between the first portion and the second portion, wherein the second layout rule is different from the first layout rule.

2. The method of claim 1, wherein the first portion comprises a core portion of the integrated circuit and wherein the second portion comprises an input/output portion of the integrated circuit.

3. The method of claim 1, wherein the integrated circuit further comprises a first input/output pad and a second input/output pad, and wherein the training data is further derived from a third layout rule concerning a second spacing between the first input/output pad and the second input/output pad.

4. The method of claim 3, further comprising using the learning-based system generating a fourth layout rule concerning the second spacing between the first input/output pad and the second input/output data, wherein the fourth layout rule is different from the third layout rule.

5. The method of claim 1, wherein the integrated circuit further comprises a buried guard ring, and wherein the training data is further derived from a fifth layout rule concerning at least one dimension associated with the buried guard ring.

6. The method of claim 5, further comprising using the learning-based system generating a sixth layout rule concerning the at least one dimension associated with the buried guard ring, wherein the sixth layout rule is different from the fifth layout rule.

7. The method of claim 1, wherein the integrated circuit further comprises a first well and a second well, and wherein the first well comprises a plurality of a first type of devices and the second well comprises a plurality of a second type of devices, and wherein the training data is derived from a seventh layout rule concerning a first minimum spacing between two of the plurality of the first type of devices and a second minimum spacing between two of the plurality of the second type of devices.

8. The method of claim 7, further comprising using the learning-based system generating an eighth layout rule concerning the first minimum spacing and the second minimum spacing, wherein the eighth layout rule is different from the seventh layout rule.

9. A learning-based system comprising:
at least one processor; and
at least one memory comprising instructions to:
obtain latch-up data concerning an integrated circuit, wherein the integrated circuit comprises a first portion and a second portion,
train the learning-based system based on training data derived from the latch-up data and a first layout rule concerning a first spacing between the first portion and the second portion, and
generate a second layout rule concerning the first spacing between the first portion and the second portion, wherein the second layout rule is different from the first layout rule.

10. The system of claim 9, wherein the first portion comprises a core portion of the integrated circuit and wherein the second portion comprises an input/output portion of the integrated circuit.

11. The system of claim 9, wherein the integrated circuit further comprises a first input/output pad and a second input/output pad, and wherein the training data is further derived from a third layout rule concerning a second spacing between the first input/output pad and the second input/output pad.

12. The system of claim 11 further comprising instructions to, using the learning-based system, generate a fourth layout rule concerning the second spacing between the first input/output pad and the second input/output data, wherein the fourth layout rule is different from the third layout rule.

13. The system of claim 12, wherein the integrated circuit further comprises a buried guard ring, and wherein the training data is further derived from a fifth layout rule concerning at least one dimension associated with the buried guard ring.

14. The system of claim 13 further comprising instructions to, using the learning-based system, generate a sixth layout rule concerning the at least one dimension associated with the buried guard ring, wherein the sixth layout rule is different from the fifth layout rule.

15. The system of claim 14, wherein the integrated circuit further comprises a first well and a second well, and wherein the first well comprises a plurality of a first type of devices and the second well comprises a plurality of a second type of devices, and wherein the training data is derived from a seventh layout rule concerning a first minimum spacing between two of the plurality of the first type of devices and a second minimum spacing between two of the plurality of the second type of devices.

16. The system of claim 15 further comprising instructions to, using the learning-based system, generate an eighth layout rule concerning the first minimum spacing and the second minimum spacing, wherein the eighth layout rule is different from the seventh layout rule.

17. The system of claim 16 further comprising instructions to, based at least on the second layout rule, the fourth layout rule, the sixth layout rule, and the eighth layout rule, generate control data for controlling formation of a plurality of masks configured to form a plurality of patterned layers corresponding to an instance of the integrated circuit.

18. A non-transitory computer-readable medium comprising instructions for a method, implemented by a learning-based system comprising at least one processor, the method comprising:
obtaining latch-up data concerning an integrated circuit, wherein the integrated circuit comprises a first portion and a second portion;
training the learning-based system based on training data derived from the latch-up data and a first layout rule concerning a first spacing between the first portion and the second portion; and generating a second layout rule concerning the first spacing between the first portion and the second portion, wherein the second layout rule is different from the first layout rule.

19. The non-transitory computer-readable medium of claim 18, wherein the integrated circuit further comprises a first input/output pad and a second input/output pad, and wherein the training data is further derived from a third layout rule concerning a second spacing between the first input/output pad and the second input/output pad.

20. The non-transitory computer-readable medium of claim 18, wherein the integrated circuit further comprises a buried guard ring, and wherein the training data is further derived from a fourth layout rule concerning at least one dimension associated with the buried guard ring.

* * * * *